J. W. HORNSEY.
PROCESS OF EXTRACTING VALUABLE COMPONENTS FROM RAW MATERIALS.
APPLICATION FILED JUNE 29, 1916.

1,373,731.

Patented Apr. 5, 1921.

Inventor
John W. Hornsey, by
J. A. Witherspoon
Attorney

Witness

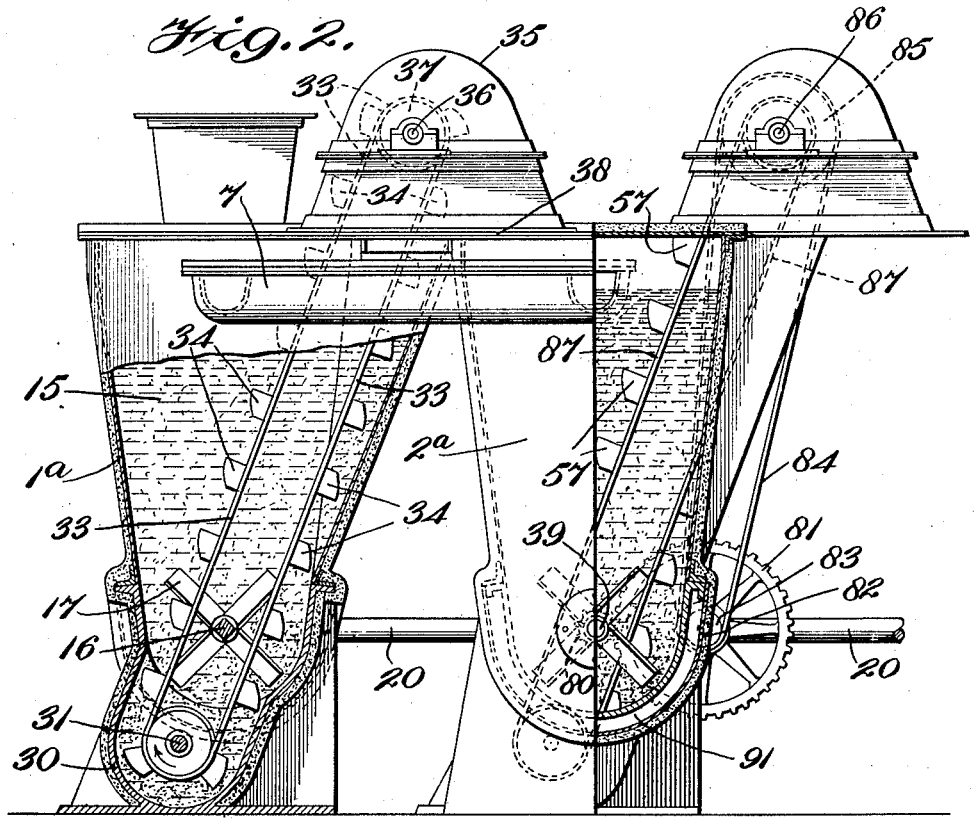
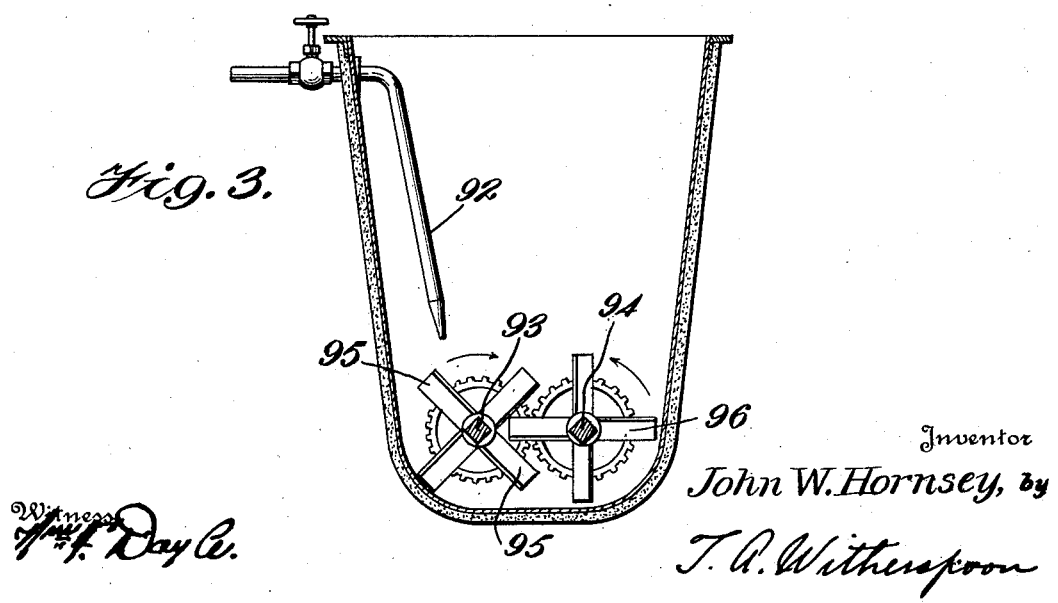

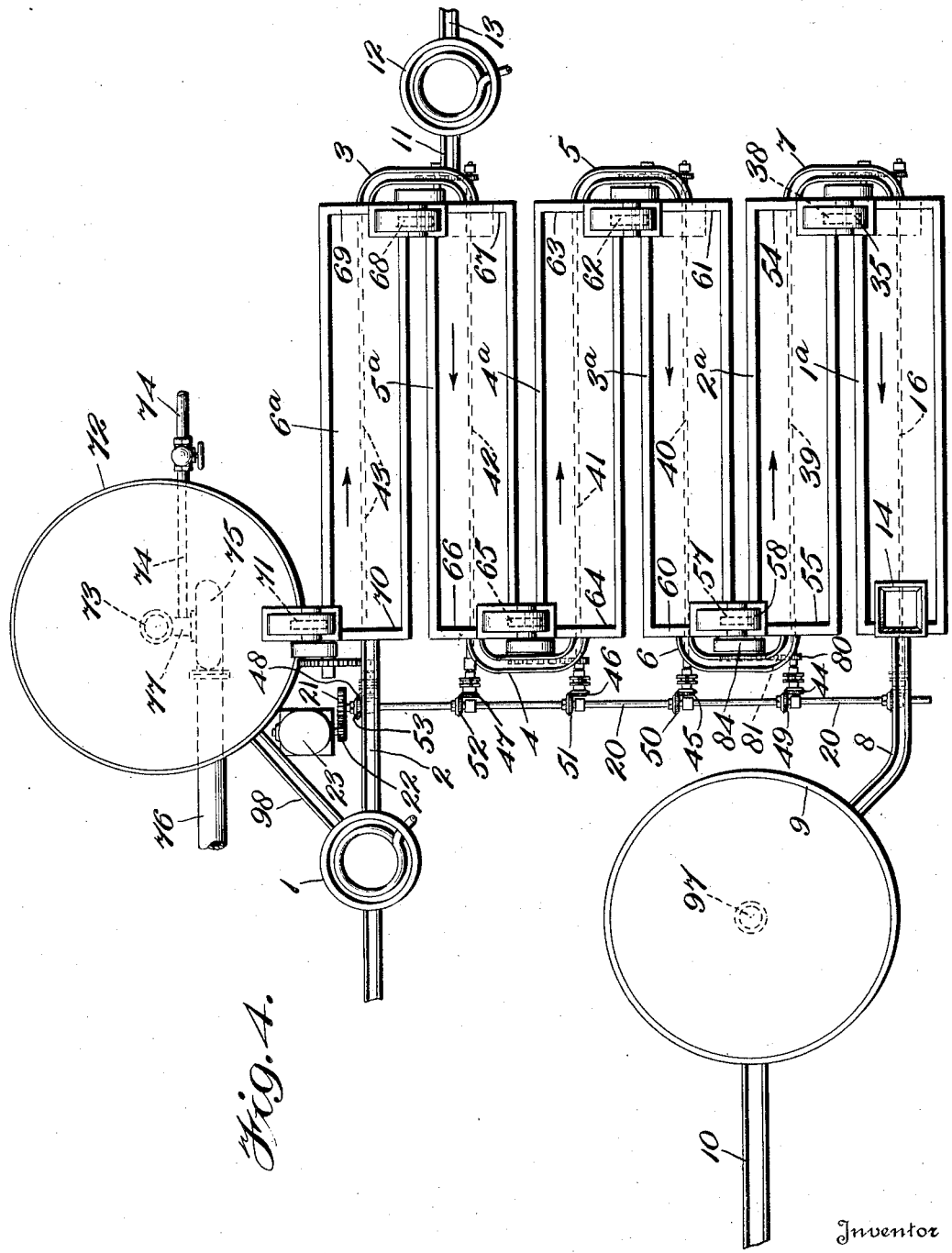

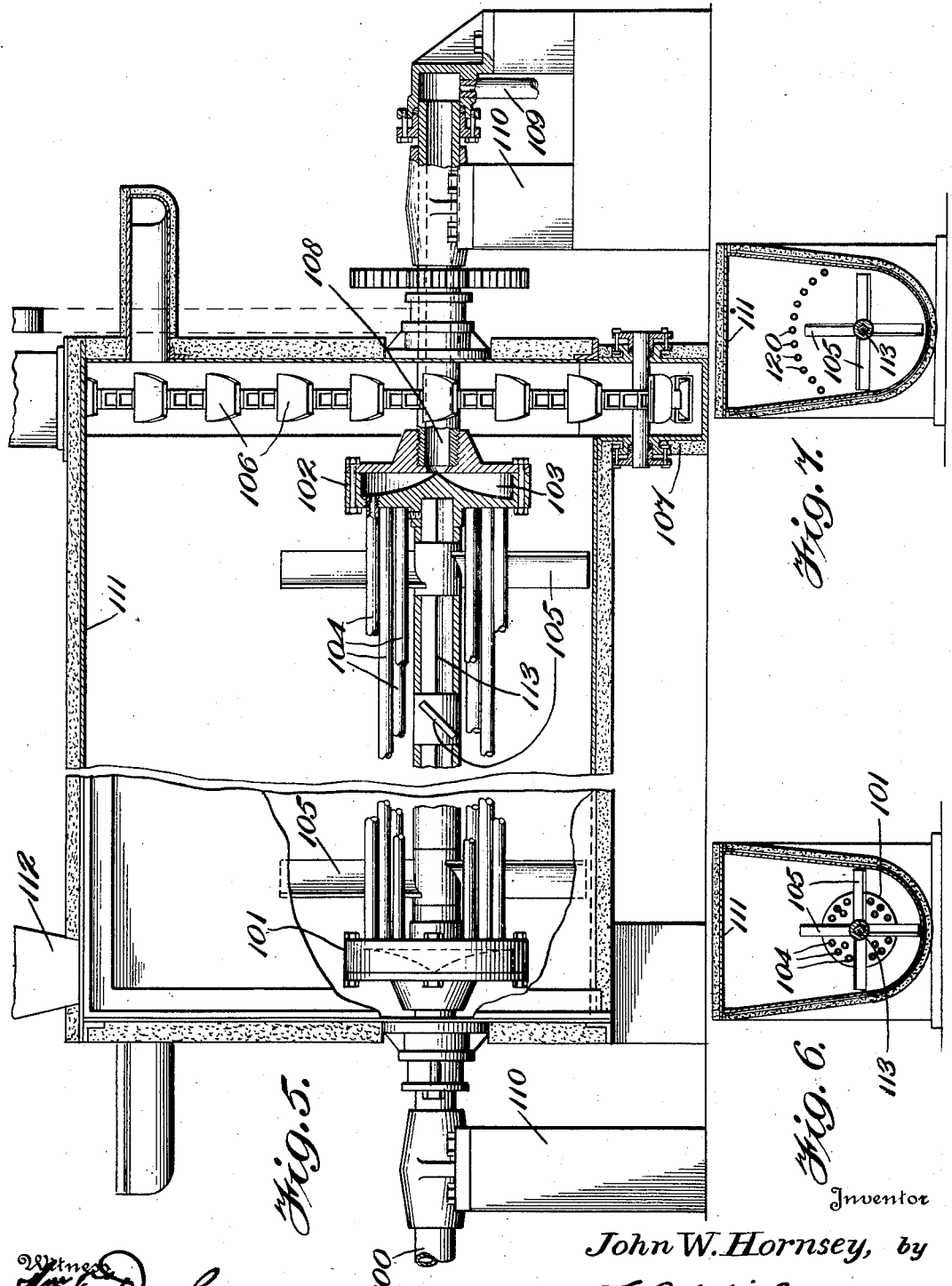

UNITED STATES PATENT OFFICE.

JOHN W. HORNSEY, OF SUMMIT, NEW JERSEY.

PROCESS OF EXTRACTING VALUABLE COMPONENTS FROM RAW MATERIALS.

1,373,731.

Specification of Letters Patent.

Patented Apr. 5, 1921.

Application filed June 29, 1916. Serial No. 106,677.

*To all whom it may concern:*

Be it known that I, JOHN W. HORNSEY, a citizen of the United States, residing at Summit, in the county of Union and State of New Jersey, have invented certain new and useful Improvements in Processes of Extracting Valuable Components From Raw Materials; and I do hereby declare the following to be a full, clear, and exact description of the invention, such as will enable others skilled in the art to which it appertains to make and use the same.

This invention relates to a process of and an apparatus for extracting salts or other soluble substances from crude materials and has for its object to extract said salts and materials in a manner more efficient and less costly than those heretofore proposed.

With these and other objects in view the invention consists in the novel steps and combinations of steps constituting the process, and in the novel combinations of parts constituting the apparatus, all as will be more fully hereinafter disclosed and particularly pointed out in the claim.

This invention is of general application, but is especially adapted for the extraction of sodium nitrate, $NaNO_3$, from the crude salts in which it occurs in Chile and elsewhere, and containing among other things sodium chlorid, $NaCl$, and sodium sulfate, $Na_2SO_4$. It is also particularly useful in extracting potassium compounds from the mixtures of crude salts in which they are found.

In both of these cases, the sodium and potassium compounds are much more soluble in hot water than in cold water while the solubilities of the other salts or compounds with which they are associated are not greatly affected by changes in temperature. It therefore follows that if a solution be saturated at a more or less elevated temperature with the various salts found in the crude material, and then cooled, the desired sodium and potassium compounds will be precipitated, while the resulting mother liquor will, upon heating, have its capacity of dissolving further quantities of said sodium and potassium compounds restored, but it will be unable to dissolve any substantial further quantities of the contaminating impurities unless, of course, a greater or less quantity of said impurities have been removed from said mother liquor.

Accordingly, I continuously circulate through the apparatus a mother liquor saturated with the contaminating salts, and therefore incapable of taking up any substantial additional quantities of said salts, at operating temperatures; and by alternately raising and lowering the temperature of said mother liquor, I cause the same to extract from the crude material the desired sodium and potassium salts and to deposit them in suitable cooling apparatus. Said mother liquor therefore constitutes an extracting and conveying agent for the valuable compounds, which selects and separates out said components and delivers them at a predetermined point in the circuit, all as will appear more fully below.

Referring to the accompanying drawings forming a part of this specification, in which like numerals designate like parts in all the views:—

Fig. 2 is an end elevational view partly in section of a portion of the parts shown in Fig. 1;

Fig. 3 is a diagrammatic sectional elevational view of a slightly modified form of tank suitable for use in connection with the apparatus illustrated in Figs. 1 and 2;

Fig. 4 is a diagrammatic plan view of a battery of tanks of the general construction illustrated in Figs. 1 and 2;

Fig. 5 is a longitudinal sectional elevational view of another modified form of apparatus suitable for carrying out the invention;

Fig. 6 is a transverse sectional view of the parts shown in Fig. 5; and

Fig. 7 is a view similar to Fig. 6, showing a still further modified form of apparatus suitable for carrying out the invention.

Figure 1:
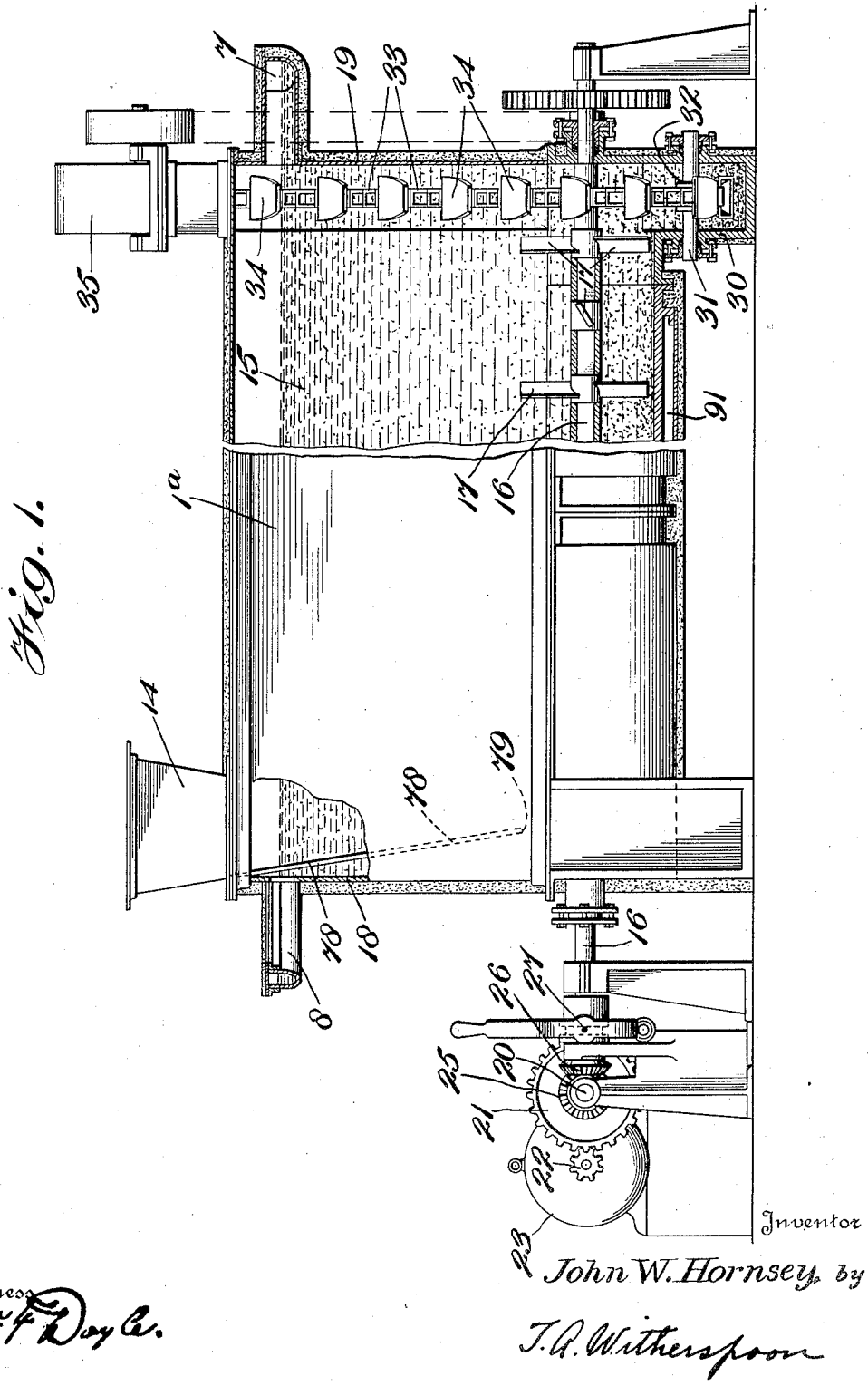
Figure 1 is a diagrammatic elevational view partly in section of an apparatus made in accordance with this invention.

Wash water from previously treated material, as well as any additional water, or any "make up" water that may be desired is preferably passed through a heater such as 1. From said heater said water next enters the pipe 2, and then enters a tank such as $6^a$, from which it passes to a connection 3 joining said tank $6^a$ with a similar tank $5^a$. From said tank $5^a$, it enters the connection 4 joining the tank $5^a$ with the tank $4^a$ and after leaving said tank $4^a$ it enters the connection 5 which joins the said tank $4^a$ with the similar tank $3^a$ from which it passes into the connection 6 joining said tank 3ª with the tank 2ª, out of which it passes into the connection 7, joining said tank 2ª with the tank 1ª, and from said tank 1ª the said water enters the connection 8, joining said tank 1ª with the settling tank 9. The said water preferably fills the settling tank 9, and overflows from its top portion entering the connection 10, which preferably conveys the same to the cooling and crystallizing apparatus.

Joining the connection 3, is a connection 11 leading from the heater 12, and joining said heater 12 is the pipe or connection 13, adapted to convey a mother liquor from the cooling and crystallizing apparatus, not shown, but which may be conveniently the same to which the said connection 10 leads.

The connection 11 entering the connection 3 as shown, causes the first mentioned wash water and said mother liquor to become mixed in the tank 5ª and from that point on, the two liquors become one.

Referring more particularly to Fig. 1, the tank 1ª is preferably provided with a feed hopper such as 14, adapted to receive the raw material such as crude salts from which nitrate is made in Chile. The said material conveniently falls by gravity through the hopper 14 into the liquid 15 contained in said tank. Located near the bottom of said tank 1ª is a shaft 16 preferably horizontally disposed, and provided with a plurality of inclined paddles constituting a sort of screw conveyer, so that as said paddles rotate the solid undissolved material is moved from the end 18 of the tank toward the end 19 thereof. Said shaft 16 is conveniently driven from the shaft 20 carrying the gear 21, connected with the gear 22, driven by any suitable motor 23. The connection between the shaft 16 and the shaft 20 is effected by means of the bevel gears 25 and 26, as illustrated, and there is preferably provided any suitable clutch mechanism 27 by which the power may be cut on or cut off from the said shaft 16.

The fluid 15 in said tank having passed through the heaters 1 and 12, as above disclosed, is at a temperature preferably just below the boiling point, and therefore, a portion of the sodium nitrate, $NaNO_3$, contained in the crude material is dissolved out as the said material is carried from the end 18 of the said tank to the end 19 thereof by the shaft 16 and the paddles 17.

The solution of said nitrate is greatly facilitated by the stirring action due to the paddles, and the undissolved solid material is carried to and deposited in the settling well, or pocket 30 with which the tank 1ª is provided.

Conveniently mounted in the said settling well 30 is a short shaft such as 31 carrying a sprocket or other means 32 around which a sprocket chain 33 may pass, and located on said sprocket chain are a plurality of buckets or other elevating means 34, while at the top of said tank 1ª is a housing or other structure 35, in which is mounted a shaft 36 carrying a similar sprocket 37 around which said sprocket chain 33 also passes. The said housing 35 provides a passage for the solid material from the tank 1ª to the tank 2ª so that the individual buckets 34 readily raise the solid material to said passage, carry it over the said sprocket wheel 37, and dump it into the next tank 2ª as at the point 38, all as will be readily understood from the drawings.

Each of the tanks, 2ª, 3ª, 4ª, 5ª and 6ª are, or may be, substantial duplicates of the tank 1ª except they are not necessarily provided with hoppers such as 14. They are however, provided with stirring shafts numbered respectively, 39, 40, 41, 42 and 43 which shafts respectively carry the bevel gears 44, 45, 46, 47 and 48 respectively meshing with similar bevel gears 49, 50, 51, 52 and 53 mounted on the power shaft 20, all as will be clear from the drawings.

It therefore follows that as the solid material is dumped from the buckets 34 into the tank 2ª at the point 38, the said shaft 39 together with its stirrers, not shown, not only causes an active, brisk or energetic agitation of the liquid and solids therein, but it transfers the undissolved solids from the end 54 of said tank 2ª to the end 55 thereof, whereupon the said undissolved solids are delivered into a settling well not shown, but which may be substantially in all respects similar to the settling well 30 above disclosed.

Associated with the settling well with which the tank 2ª is provided, is an elevator or conveyer 57 provided with buckets substantially similar to the buckets 34, above mentioned. Said elevator 57 transfers the undissolved solids from the tank 2ª to the tank 3ª at the point 58. After entering the said tank 3ª the said undissolved solids and the liquid therein are agitated by the shaft 40, and the paddles, not shown, that are carried thereby. An additional portion of the contained sodium nitrate is thus dissolved in said tanks 2ª and 3ª from said solids. The undissolved solids are further carried from the end 60 of said tank 3ª to the end 61 thereof, whereupon they are delivered into a settling well not shown, but which is, or may be in all respects similar to the settling well 30 above disclosed, whereupon another elevator or conveyer 62 transfers said undissolved solids from the tank 3ª into the tank 4ª whereupon they are carried from the end 63 of said tank to the end 64 thereof by the rotating shaft 41 and paddles thereon, not shown, and delivered into another settling well, not illustrated, but which is entered by the elevator 65.

The said elevator 65 transfers the remaining undissolved solids from the tank 4ᵃ to the tank 5ᵃ whereupon the rotating shaft 42 and its paddles, not shown, carries any solids which still remain undissolved from the end 66 of said tank to the end 67 thereof, and delivers them to a settling well, not illustrated, but which is entered by the elevator 68 which transfers them to the tank 6ᵃ whereupon they are subjected to the action of the paddles, not shown, carried by the rotating shaft 43, and transported from end 69 of said tank to the end 70 thereof, whereupon any solids which remain undissolved enter a settling well, now shown, but which is entered by the elevator 71 and said solids are thereupon transferred to the settling tank 72.

So far as has now been disclosed it will be clear that wash water, for example, entering the heater 1 and mother liquor entering the heater 12, will continuously pass through the series of tanks numbered from 1ᵃ to 6ᵃ, into the settling tank 9, overflow from said settling tank into the connection 10, and from the connection 10 will flow into a series of cooling or crystallizing tanks or other apparatus not shown, from which it will again enter the connection 13, and be returned as mother liquor, to the said tanks numbered from 1ᵃ to 6ᵃ. Thus the same water will be continuously circulated through the said tanks 1ᵃ, etc., and constitute an extractor and conveyer of the valuable components in the manner above mentioned.

It will be further clear that the crude solid material it is desired to treat, will enter the first tank 1ᵃ and be conveyed by the screw or other conveyer from one end of said tank to the other, while the said material and the hot liquor in the said tank is actively agitated, thus facilitating the dissolving out of the desired constituent, which may be sodium nitrate $NaNO_3$, for example.

It will further be clear that the undissolved material in one tank is successively transferred to another tank, and there subjected to agitation and solution, and so on until all the salts soluble in the menstruum have been extracted from the solid material, whereupon the undissolved residue may be delivered into a settling tank such as 72.

The said tank 72 may be of any suitable construction and material, but is preferably provided with a shaft and plows not shown, adapted to move the thickened solid residue from the periphery toward the center, whereupon the said residue is delivered into a pipe or other discharge 73.

From the said discharge 73, the solid material may be delivered directly into a car, or conveyer, and carried to the dump. On the other hand, if it is desired to remove the said solid residue by means of a pump, water may enter the connection 77 through the pipe 74, whereupon the mixture of residue and water may be withdrawn by the pump 75 and forced into the waste pipe 76 and thence to the dump.

Associated with the said hopper 14 is a baffle 78 (see Fig. 1), which prevents the solid material entering said hopper from flowing out of the tank 1ᵃ through the pipe, or connection 8. In other words, this baffle requires the liquor entering said connection 8 to flow under its lower edge 79 and upwardly to said connection 8.

Each of the elevators 33, 57, 62, 68 and 71 are provided with driving means deriving their power from their respective agitating shafts such as 16, 39, etc. Any suitable means for conveying power from the respective agitating shafts to the sprocket chains of the elevators may be provided, but I prefer to employ a means such as that illustrated in Fig. 2, wherein the stirrer or agitating shaft 39, is provided with a small gear 80 meshing with a larger gear 81 mounted on a shaft 82, which also carries a pulley or other driving means 83, around which passes a belt or other driving means 84, and which belt passes around a pulley 85 carried by the shaft 86, around which passes the particular sprocket chain 87 associated with the elevator 57.

The purpose of the mechanism thus disclosed is to drive the elevator shafts at a speed different from that of the stirrer shafts, in order to provide time for the solids to settle in the various settling wells.

When working on nitrate or similar materials it is desirable to provide a suitable lagging such as asbestos or other heat insulating substance, on the outside of the tanks in order to prevent loss of heat by radiation and conduction.

As is well known the efficiency of the dissolving action will depend upon the temperature that is maintained in the various tanks, and therefore, in order to control this temperature and maintain it at the desired point, I may provide one or more of the tanks with extraneous means of heating, such as steam or other jackets, and accordingly, in Figs. 1 and 2, I have illustrated a steam jacket 91. These said jackets are shown as covering only a portion of their tanks, but it is evident that they may extend to the top of the tanks when desired.

In dealing with some salts only the tank 1ᵃ may need to be thus provided with a jacket; and in fact, although I have shown six tanks in the drawings, in some processes it is only necessary to use two tanks while in others only a single tank is required.

In other cases, and in fact, when treating nitrate materials, it is frequently convenient to do away with the steam jackets and introduce one or more jets 92 of steam directly into the tanks. Such an arrangement is illustrated in the slightly modified form of the invention shown in Fig. 3.

In said Fig. 3 I have further shown a slightly modified form of stirrer apparatus, wherein I have provided the plurality of shafts 93 and 94, carrying the stirrer arms 95 and 96, which are conveniently rotated in opposite directions, but as in the previous case, are inclined at such angles to their shafts as to constitute conveyers to carry the solid material from one end of the tank to the other.

The purpose of thus reversely rotating the paddles 95 and 96 is to throw the material in opposite directions, and thus to bring about a more intimate contact between the liquor and solids than would otherwise be the case. In other words, it will be clear that the more violently the liquor and solids are agitated in the tank, the quicker and more efficient will be the dissolving action.

In all cases I prefer to bring the solid material to a suitable state of subdivision, as for example, to a granular form as distinguished from the large lumps which are now usually employed in the nitrate industry.

It is an important feature of this invention that the material contacts with the paddles, and thus is subjected to a sort of grinding action. Further the different particles of the material are caused to contact with each other under the action of the paddles, and thus a tendency to a still further subdivision is had. Again, the action of the liquor in dissolving out the nitrate renders the material more porous, and thereby facilitates the subdividing action of the paddles.

Owing to the above features I am enabled to get the nitrate, potassium compound or other valuable component into solution very much quicker than is possible by prior processes. Furthermore, the efficiency of the process is thereby increased. In other words, my process will extract not only a much greater percentage of the contained valuable component, such as the nitrate, but will do it in a much shorter time than any process which has been heretofore proposed.

As the hot solution enters the settling tank 9, from the connection 8, it is in a substantially saturated condition, and also carries some matters in suspension. It is desirable that such suspended matters be not carried into the crystallizing apparatus because they would thus lower the purity of the crystallized product. Therefore, as stated above, the hot solution is preferably drawn from the top of the tank 9 through the connection 10, and said suspended matter is allowed to settle in said tank 9, whence it may be drawn off through the connection 97, and if desired by any suitable means, not shown, delivered back to the hopper 14 and repassed through the tanks lettered from 1ª to 6ª; or, said solids may be disposed of in any other suitable manner. In some processes it may be desirable to evaporate a portion of the water from the liquid in tank 9 and this will precipitate a portion of the contained impurities. In other cases, it may be desirable to slightly lower the temperature of tank 9, which will cause a greater or less precipitation of the product, as for example, the nitrate. Therefore, it is desirable to provide a connection between the said tank 9 and hopper 14, even though said connection in all cases may not be employed.

I further prefer to provide a connection 98 between the settling tank 72 and the heater 1, so that at least a portion of the liquid carried over into said tank by the elevator 71 may be recovered and returned to the circulating system.

Coming now to the modified form of the invention illustrated in Figs. 5 and 6, the principle of operation is the same as in the preceding figures, but the apparatus is changed as illustrated. That is to say, 100 represents a hollow shaft adapted to be connected to a source of steam supply, 101 represents a manifold head, 102 a similar head, each of which is provided with the cavities, or spaces 103, and connected with said spaces are a plurality of manifold steam pipes 104. Said shaft is further provided with the inclined paddles 105, acting as screw conveyers in the manner above disclosed, and an elevator 106 is further associated with the tank 111, which enters the settling well 107, all as will be clear from the drawings. The space 103 with which the manifold head 102 is provided, is connected with the hollow shaft 108 having the exit pipe 109 for the discharge of the steam or condensed water. 110 represents suitable bearings for the shaft, while tank 111 is or may be of substantially the same construction as those previously described, either with or without the steam jackets. 112 represents a feeding hopper which is or may be substantially of the same construction as the hopper 14.

The operation of the mechanism illustrated in Figs. 5 and 6 will be readily understood, but may be briefly described as follows:—

The steam entering the hollow shaft 100 passes to, and through the manifold head 101, through the manifold pipes 104, to and through the manifold head 102, to and through the hollow shaft 108; and as condensed water, or steam, passes through the outlet 109. It thus heats the liquid in the tank 111, while the solid material is fed into the said tank 111 through the feed hopper 112, and is thoroughly agitated by the paddles 105 carried by the agitating shaft 113, while said paddles further transport the solid material from one end of the tank to the other, and deliver it into the settling well 107, whereupon it is transferred from said tank 111 by the elevator mechanism to another and similar tank, not shown, all as will be clear from Figs. 4 and 5.

Of course, in this case as in the case of the construction shown in Fig. 4, a single tank may be used, or a plurality of tanks, as may be required. The manifold pipes 104, serve to maintain the liquor at the desired temperature, while the said pipes aid the agitation as well as the paddles.

In the further modified form of the invention shown in Fig. 7, the pipes 104, as well as the manifold heads 101 and 102 are omitted, and a plurality of stationary pipes 120 are provided in each tank, through which steam may be passed from any suitable source, not illustrated. The said pipes 120 serve as in the previous case, to maintain the liquor at the desired temperature.

It will thus be seen that in all cases the liquor entering, for example, through the pipes 2 and 13, comes in contact with material which has been more or less exhausted and as it passes through the series of tanks it constantly meets material which is richer and richer in the components to be extracted, and finally when the said liquor has been substantially saturated with said components, it is brought into contact with raw material which is richest of all in the said components. On the other hand, the solids in their course of travel through the series of tanks come into contact with liquor less and less saturated with the components that are to be extracted, until in the last tank of the series, it comes into contact with a wash or other water which is capable of extracting from the solids a maximum quantity of the component desired.

In this manner it will be seen that I have provided a counter current method of extracting nitrate or other valuable components from crude material, wherein the liquor continuously selects the desired component, separates it from the contaminating constituents, conveys it to a selected distant point and there deposits it, all in a manner very much quicker and more efficient than has been heretofore proposed.

In fact owing to these features I am enabled to extract with profit, nitrates and other components from lean ores heretofore considered commercially impossible to work and from tailings that are at present considered substantially worthless.

It is obvious that those skilled in the art may vary the details of the construction and the arrangement of parts of the apparatus, as well as the steps and combinations of steps constituting the process, without departing from the spirit of the invention, and therefore, I do not wish to be limited to the above disclosure except as may be required by the claim.

What I claim is:—

The process of extracting a soluble salt from a raw material, carrying said salt and other ingredients, which consists in providing a mother liquor containing and adapted to be saturated with said other ingredients between the ranges of working temperatures, moving said material and mother liquor in opposite directions in contact with each other while energetically agitating the same to dissolve said salt, separating the solid and liquid and removing the liquid from a quiet zone remote from the agitated zone.

In testimony whereof I affix my signature.

JOHN W. HORNSEY.